United States Patent
Kang et al.

(10) Patent No.: US 9,240,899 B2
(45) Date of Patent: Jan. 19, 2016

(54) METHOD FOR IMPLEMENTING VIRTUAL NETWORK PORT AND EMBEDDED DEVICE FOR IMPLEMENTING VIRTUAL NETWORK PORT

(75) Inventors: Haitao Kang, Shenzhen (CN); Hairong Bian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1013 days.

(21) Appl. No.: 13/379,456

(22) PCT Filed: Aug. 26, 2009

(86) PCT No.: PCT/CN2009/073512
§ 371 (c)(1),
(2), (4) Date: Jan. 17, 2012

(87) PCT Pub. No.: WO2010/145091
PCT Pub. Date: Dec. 23, 2010

(65) Prior Publication Data
US 2012/0127887 A1 May 24, 2012

(30) Foreign Application Priority Data
Jun. 29, 2009 (CN) .......................... 2009 1 0150679

(51) Int. Cl.
*H04L 12/26* (2006.01)
*H04L 12/46* (2006.01)
*H04L 29/06* (2006.01)

(52) U.S. Cl.
CPC ........ *H04L 12/4633* (2013.01); *H04L 12/4641* (2013.01); *H04L 69/03* (2013.01); *H04L 69/16* (2013.01); *H04L 2212/00* (2013.01)

(58) Field of Classification Search
CPC . H04L 12/4633; H04L 12/4641; H04L 69/03; H04L 69/16; H04L 2212/0025
USPC ........................................................ 370/252
See application file for complete search history.

(56) References Cited

U.S. PATENT DOCUMENTS 6,578,084 B1 * 6/2003 Moberg et al. ................ 709/236
7,002,976 B2   2/2006 Dupont
(Continued)

FOREIGN PATENT DOCUMENTS

CN   1474564 A    2/2004
CN   1859417 A   11/2006
(Continued)

OTHER PUBLICATIONS

International Search Report for PCT/CN2009/073512 dated Mar. 29, 2010.
(Continued)

*Primary Examiner* — Ayaz Sheikh
*Assistant Examiner* — Hai-Chang Hsiung
(74) *Attorney, Agent, or Firm* — Ling Wu; Stephen Yang; Ling and Yang Intellectual Property

(57) ABSTRACT

A method for implementing a virtual network interface, which is applicable for the embedded device without a physical network interface equipped, including that: the embedded device encapsulates the to-be-transmitted IP data packet as the data frame which is able to be identified by the universal interface on the device and carries a virtual network port identifier, transmits the data frame through the universal interface; after the embedded device receives the data frame from the universal interface, the embedded device delivers the IP data packet parsed from the received data frames to the application layer when determining that the received data frame carries a virtual network port identifier. An embedded device for implementing a virtual network interface is also provided, the device includes a universal interface, a determining module, an encapsulating/decapsulating module, and a sending/receiving module.

5 Claims, 1 Drawing Sheet frame head

| UART/HDLC/I2C/SPI frame head (carrying virtual network interface identity) | IP datagram (46~1500bytes) | check (1bytes) |

(56) References Cited

U.S. PATENT DOCUMENTS

| | | | |
|---|---|---|---|
| 7,451,479 B2 | 11/2008 | Yeh et al. | |
| 7,826,381 B1* | 11/2010 | Kastuar et al. | 370/242 |
| 2002/0123365 A1* | 9/2002 | Thorson et al. | 455/524 |
| 2010/0265398 A1* | 10/2010 | Johnson et al. | 348/500 |

FOREIGN PATENT DOCUMENTS

| | | |
|---|---|---|
| CN | 1980178 A | 6/2007 |
| CN | 101355483 A | 1/2009 |
| CN | 101420341 A | 4/2009 |

OTHER PUBLICATIONS

HDLC Derived Protocols; High Speed Date Link Control Defined, A Tutorial by Ben Dewey Senior Product Manger SBE Inc.; XP55074331A.

Ben Greenberg, Bartosz Mach, Adviser: Dr. Vincenzo Liberatore; IP-Over-USB Gateway; Final Project Report ; XP002389883; See pp. 1-19.

The GNU/Linux "usbnet" Driver Framework; David Brownell <dbrownell@users.sourceforge.net>, Last Modified: Sep. 27, 2005; XP55074339A.

* cited by examiner

METHOD FOR IMPLEMENTING VIRTUAL NETWORK PORT AND EMBEDDED DEVICE FOR IMPLEMENTING VIRTUAL NETWORK PORT

TECHNICAL FIELD

The present invention relates to communication field, and especially relates to a method for implementing virtual network interface and an embedded device for implementing virtual network interface.

BACKGROUND OF THE RELATED ART

In view of actual application, one or more types of the universal interfaces, such as Ethernet/UART (Universal Asynchronous Receiver/Transmitter)/HDLC (High-Level Data Link Control)/I2C (Inter Integrated Circuit)/SPI (Serial Peripheral Interface), are configured in lots of embedded systems, while network interfaces are not configured in some application environments in view of cost and miniaturization.

There are higher demands on the low cost, miniaturization and low power consumption of a communication device with the continual maturity of IT technology and daily fierce competition. The simplification of up and down service interface need to be considered, and some unnecessary hardware need to be discarded during the product global design. For example, with regard to ordinary single board, the requirement may be satisfied simply by preserving parallel interfaces for debugging without any network interfaces, thus, not only the hardware cost can be reduced, but also the wiring can be reduced and the size of printed board can be reduced. However, the network interfaces may offer more services of application layer, e.g. FTP (File Transfer Protocol)/HTTP (Hypertext Transfer Protocol)/TELNET (TCP/IP terminal emulation protocol)/NFS (Net File System) compared to series interfaces, these application services could not by applied without configuring the network interfaces.

SUMMARY OF THE INVENTION

In order to solve the problem in the prior art, a method for realizing virtual network interface and embedded device for realizing virtual network interface is provided in the present invention, so as to solve the problem that the physical network interface is not be configured in the embedded device in view of the cost, placement and wiring and the like while using a network service is another demand at the same time.

In order to solve the above-mentioned problem, a method for realizing virtual network interface is provided in the present invention, which is applied to the embedded device without network interface configured in, the method comprises:

The embedded device encapsulates the to-be-transmitted IP packet as the data frame that carries a virtual network interface identifier and is able to be identified by a universal interface of the device, and then sends out the data frame via the universal interface;

The embedded device receives the data frame from the universal interface and then, if it determines that the received data frame carries a virtual network interface identifier, and it sends the IP packet parsed from the received data frame to an application layer.

The method may be further characterized as follows:
The step of the embedded device encapsulating the to-be-transmitted IP packet as the data frame that carries a virtual network interface and is able to be identified by a universal interface of the device comprises:

The embedded device adds the frame head corresponding to the type of the universal interface of the device to the to-be-transmitted IP packet, the frame head carrying the virtual network interface identifier.

The method may be further characterized as follows:
The step of the embedded device encapsulating the to-be-transmitted IP packet as the data frame that carries a virtual network interface and is able to be identified by a universal interface of the device and then sending out the data frame via the universal interface comprises:

When the embedded device determines that the to-be-transmitted packet is IP packet, the embedded device encapsulates the to-be-transmitted IP packet as the data frame that carries a virtual network interface and is able to be identified by a universal interface of the device, and puts the encapsulated data frame into the sending buffer of the universal interface.

The method further comprises:
A network interface is registered in the embedded device at the beginning, and the sending callback function of the network interface is configured to send the IP packet using the universal interface.

The method further comprises:
The receiving callback function of the network interface is configured to receive the IP packet by the universal interface at the beginning In order to solve the above-mentioned problem, an embedded device comprising a universal interface, a determining module, an encapsulating/decapsulating module and a sending/receiving module is provided by the present invention;

The determining module is configured to determine whether the to-be-transmitted packet is an IP packet or not, and if yes, send the to-be-transmitted packet to the encapsulating/decapsulating module;

The determining module is further configured to determine whether the received data frame sent from the sending/receiving module carries a virtual network interface identifier, and if yes, send the received data frame to the encapsulating/decapsulating module;

The encapsulating/decapsulating module is configured to encapsulate the IP packet received from the determining module as the data frame that carries the virtual network interface identifier and is able to be identified by universal interface, and then send the encapsulated data frame to the sending/receiving module;

The encapsulating/decapsulating module is further configured to decapsulate the data frame received from the determining module, and send the parsed IP packet to the application layer;

The sending/receiving module is configured to send out the encapsulated data frame received from the encapsulating/decapsulating module via the universal interface, and send the data frame received from the universal interface to the determining module;

The above-mentioned device may be further characterized as follows:

The encapsulating/decapsulating module is configured to encapsulate the IP packet as the data frame that carries the virtual network interface identifier and is able to be identified by universal interface by a way of: adding the frame head corresponding to the type of the universal interface of the device to the to-be-transmitted IP packet, the frame head carrying the virtual network interface identifier.

The above-mentioned device may be further characterized as follows:

the sending/receiving module is preset with a sending callback function, which is configured to send the IP packet using the universal interface.

The above-mentioned device may be further characterized as follows:

The sending/receiving module is further preset with a receiving callback function, which is configured to receive the IP packet using the universal interface.

Compared with the prior art, the present invention provides a great optimization capability for miniaturization, low cost and low power consumption of a device, in virtue of adopting the technique of virtual network interface, and this is especially important in the embedded system in which the resources are extremely limited. The advantage of the present invention is that there is no need to add any hardware and modify the present hardware layout, the smooth update will be achieved by way of re-deploying the receiving and sending function in NI bottom layer. The virtual network interface in the present invention refers to a network interface that is constructed virtually in the software level depending the existing configured physical medium, the virtual network interface shields the details of the receiving and sending of message of the bottom layer, no modifications are needed with regard to an application program, what the physical medium of bottom layer is will not need to be known from the application program perspective, so that the current applications such as FTP/HTTP/TELNET/NFS could be applied, and the highest adaptability of the system could be reached with the minimum modification.

PREFERRED EMBODIMENTS OF THE PRESENT INVENTION

Figure 1:
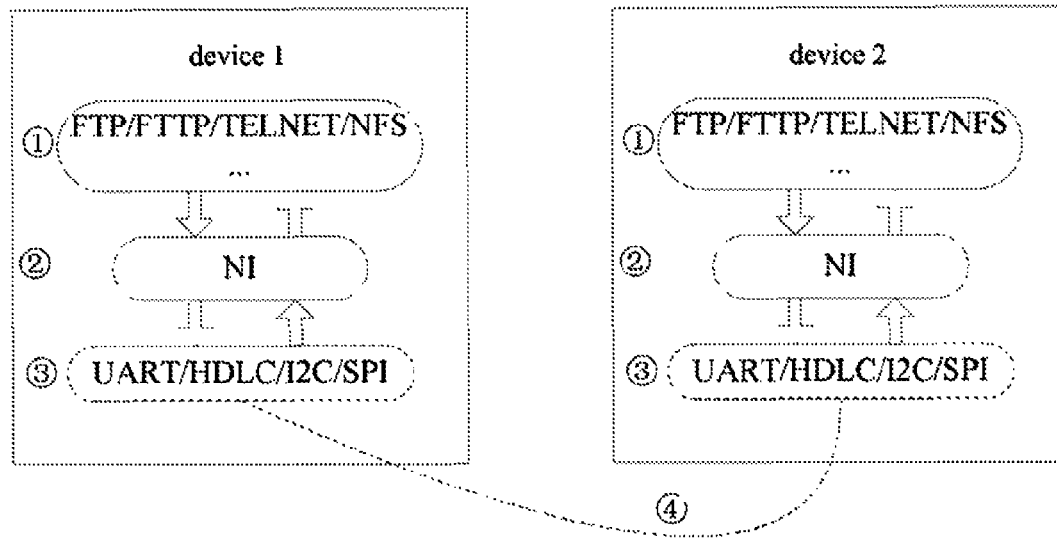
FIG. 1 is an architecture diagram of physical links of two embedded devices provided in the embodiments of the present invention.

The technical scheme of present invention will be described in combination with the accompanying figures and embodiments as below:

In the embedding technical field with extreme shortage of GUI (Graphical User Interface), the FTP/HTTP/TELNET services, especially the TELNET service, play important roles in human-computer interaction, the remote management of a network device could also be realized by this service. Therefore, in the case that the demand for communication rate is not high (when TELNET service, for example) or the network application is in an emergency need, the virtual network interface may be realized by the following method:

As shown in FIG. 1, the ③ in FIG. 1 is used to substitute for the transmitting and sending processing part of NI bottom layer, the bottom layer driver part is used to redirect the IP packets which should be sent via the network interface to a universal port UART/HDLC/I2C/SPI to send; the ④ in FIG. 1 is the backboard buss or the dedicated physical link, and this channel acts as the physical transmission medium of the virtual port. Some general network application programs such as FTP/HTTP/TELNET/NFS are developed based on a standard TCP/IP protocol.

The basic idea of the present invention is: in the embedded device without a network interface configured in it, the to-be-transmitted IP packet is encapsulated as the data frame that is able to be identified by the universal port of the embedded device and is accompanied with the virtual network interface identifier and the data frame is sent via the universal interface on this embedded device;

When the embedded device receives the data frame via the universal port, it determines whether the data frame carries a virtual port identifier, if yes, the embedded device transmits the IP packet parsed from the data frame to the application layer.

That is to say, the packet which should be sent to the network interface is redirected to the bus of UART/HDLC/I2C/SPI by the way of modifying the driving part of the bottom layer NI in sending end. Wherein, the virtual network interface identify is used to indicate that this packet is sent via the virtual network interface, the receiving end device may obtain according to this identifier that what the data frame carries actually is the IP packet although the packet is sent through the universal interface.

The case of the real network interface working is: after the message is received by the message queue in a driving player, the transmission of the callback function will lead to the network packet being written into the sending buffer of network interface, and driving the packet to the network; the receiving of the callback function will lead to the message being received in receiving buffer of the network interface and the message then being transmitted to the message queue in application layer. Thereby a modification may be made in the driving part of the bottom layer network interface, a virtual network interface NI is registered, each NI corresponds to a group of callback functions for sending and receiving, because the callback function could be user-defined, therefore the message may be written into the sending buffer of the universal interface in the embedded device in the callback function for sending; while the callback function for receiving may be modified to obtain the message from the receiving buffer of above-mentioned universal interface and transmit the message to the message queue in application layer, in such a way, the redirection of the message inside the physical channel could be finished. By this virtual network interface, an embedded device with a universal interface may use network service with the greatest advantage being that software in application player needs not to be modified, because the application program does not care about what medium the socket of the bottom layer is sent by substantially, and does not care about from where the packet is received by the operating system, what is needed is calling the socket system, improving the performance of the embedded system greatly with keeping the cost un-increased.

Figure 2:
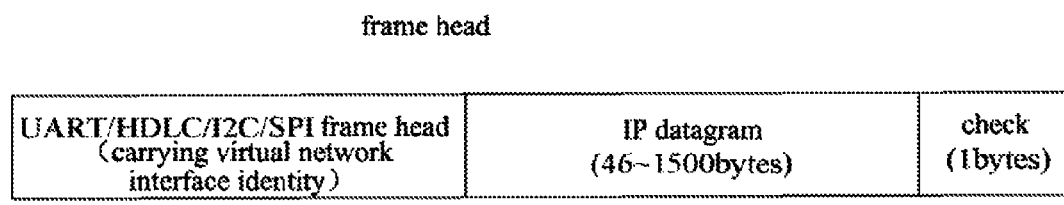
FIG. 2 is an architecture diagram of the encapsulated IP packet provided in the embodiments of the present invention.

Below, the above-mentioned way of modifying the network interface of the bottom layer will be described by taking registering a virtual network interface under the linux operating system as example, including:

Step one: registering a virtual network interface to a driving layer;

Step two: modifying the callback function for sending of the registered virtual network interface, altering sending by a network interface to sending by UART/HDLC/I2C/SPI, namely, the datagram that should be written into the sending buffer of the network interface being written into the sending buffer of the UART/HDLC/I2C/SPI in the callback function for sending;

Step three, modifying the function for receiving of the registered virtual network interface, altering sending by a network interface to sending by UART/HDLC/I2C/SPI, namely, the datagram that should be obtained from the receiving buffer of the network interface being obtained from the receiving buffer of the UART/HDLC/I2C/SPI in the callback function for receiving;

Step four, adding the operations of UART/HDLC/I2C/SPI opening, initializing and attributes such as timeout, baud rate, flow control, check-bit and stop-bit, into the program (this step is an optional step);

Step five: recompiling the kernel and validating the modifications;

In order to adapting the transmission of the IP packet on the buses such as UART/HDLC/I2C/SPI, a layer of UART/HDLC/I2C/SPI frames need to be encapsulated outside the IP packet, as shown in FIG. 2, the frame header (including virtual networking interface identify) of a protocol corresponding to universal interface should be added in front of the IP packet, banding the information like sending/receiving address, to ensure the proper transmission of the datagram in the network; and the IP packet is decapsulated at the receiving end to transmit to the application layer. Since the software of application layers of the sending end and receiving end could only access the layer of socket system calling, the bottom layer independence may help to realize the virtual interface by modifying the frame format of bottom layer, only if the IP packet is recovered to be the standard packet of IP layer before being transmitted to the application layer.

The virtual network interface realized by this way could support ordinary network application service well, especially for the TELNET service without high communication rate requirement, because it is only simple command line interaction, and these universal interface rates could exactly satisfy the requirement in application. By this way, the stability and echoing rate in the telnet service are equivalent to that in the ordinary network interface, but the telnet service can greatly save the high cost of hardware and reduce the space of the device and thus is very suitable for the monitoring system.

Figure 3:
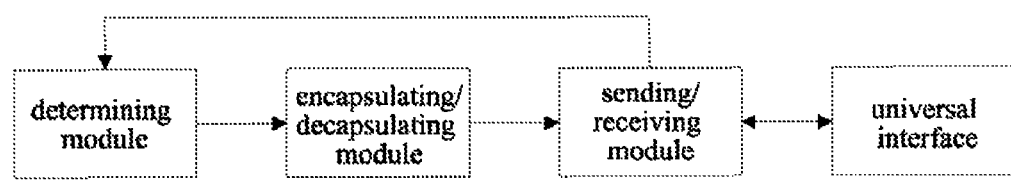
FIG. 3 is architecture diagram of the embedded device for realizing a virtual network interface provided in the embodiments of the present invention.

As shown in FIG. 3, the embedded device for realizing virtual network interface provided by the present invention comprises a universal interface, a determining module, an encapsulating/decapsulating module and a sending/receiving module;

The determining module is used to determine whether the to-be-transmitted packet is an IP packet or not, and if yes, send the packet to the encapsulating/decapsulating module; and to determine whether the data frame sent from the sending/receiving module carries a virtual network interface identifier or not, and if yes, send the data frame to the encapsulating/decapsulating module;

The encapsulating/decapsulating module is used to encapsulate the IP packet received from the determine module as the data frame that carries the virtual network interface identifier and is able to be identified by the universal interface, and then send the data frame to the sending/receiving module; and to decapsulate the data frame received from the determining module and send the parsed IP packet to the application layer;

The sending/receiving module is used to send out the data frame received from the encapsulating/decapsulating module via the universal interface; and to receive the data frame from the universal interface and send it to the determining module.

Wherein, the step that the encapsulating/decapsulating module is used to capsulate the IP packet received from the determining module as the data frame that carries the virtual network interface identifier and is able to be identified by universal interface refers to: the encapsulating/decapsulating module is used to add a frame head with the type being the same as that of universal interface to the IP packet, and a virtual network interface identifier is added into the frame head. A sending callback function is preset for the sending/receiving module which is configured to send the IP packet using universal interface. A receiving callback function is further preset for the sending/receiving module which is configured to receive the IP packet using a universal interface.

It is appreciated that there are lots of other embodiments of the present invention, those skilled in the field could make various changes and variations according to the present invention without departing from the spirit and substance of the invention, however, all these changes and variations should fall into the protection scope of claims herein appended.

INDUSTRIAL APPLICABILITY

Compared with the prior art, the present invention provides a great optimization capability for miniaturization, low cost and low power consumption of a device, in virtue of adopting the technique of virtual network interface, and this is especially important in the embedded system in which the resources are extremely limited. The advantage of the present invention is that there is no need to add any hardware and modify the present hardware layout, the smooth update will be achieved by way of re-deploying the receiving and sending function in NI bottom layer.

What is claimed is:

1. A method for sending/receiving IP packet on an embedded device comprising:
    registering a virtual network interface on the embedded device and assigning a virtual network interface identifier to the virtual network interface; wherein the virtual network interface is used to redirect IP packets, which should be sent via a physical network interface, to a universal interface;
    configuring a sending callback function of the virtual network interface to send an IP packet by using the universal interface of the embedded device;
    the embedded device adding a frame head corresponding to a type of the universal interface of the embedded device into a to-be-transmitted IP packet to encapsulate the to-be-transmitted IP packet as a first data frame, and then sending out the first data frame via the universal interface, wherein said frame head carrying the virtual network interface identifier;
    the embedded device receiving a second data frame from the universal interface and determining whether the received second data frame carries the virtual network interface identifier or not, and if yes, sending an IP packet parsed from the second received data frame to an application layer;
    wherein the embedded device is not configured with any physical network interface for transmitting/receiving IP packets, the embedded device is only configured with the virtual network interface to the universal interface, which is Universal Asynchronous Receiver/Transmitter (UART), Inter Integrated Circuit (I2C) or Serial Peripheral Interface (SPI).

2. The method according to claim 1, wherein sending out the first data frame via the universal interface, comprising:
    putting the encapsulated data frame into a sending buffer of the universal interface.

3. The method according to claim 1, further comprising:
    configuring a receiving callback function of the virtual network interface initially to receive an IP packet by using the universal interface.

4. An embedded device, comprising a universal interface, a determining module, a encapsulating/decapsulating module and a sending/receiving module, wherein:
- the sending/receiving module is configured to register a virtual network interface on the embedded device and assign a virtual network interface identifier to the virtual network interface, wherein the virtual network interface is used to redirect IP packets, which should be sent via a physical network interface, to a universal interface; preset with a sending callback function of the virtual network interface to send an IP packet by using the universal interface;
- the determining module is configured to determine whether a to-be-transmitted packet is an IP packet or not, and if yes, send the to-be-transmitted packet to the encapsulating/decapsulating module;
- the determining module is further configured to determine whether a received data frame sent by the sending/receiving module carries the virtual network interface identifier, and if yes, send the received data frame to the encapsulating/decapsulating module;
- the encapsulating/decapsulating module is configured to add a frame head corresponding to a type of the universal interface into a to-be-transmitted IP packet to encapsulate the to-be-transmitted IP packet as a first data frame, and then send the first data frame to the sending/receiving module, wherein said frame head carrying the virtual network interface identifier;
- the encapsulating/decapsulating module is further configured to parse a second data frame received from the determining module, and send the parsed IP packet to an application layer;
- the sending/receiving module is configured to send out the first data frame received from the encapsulating/decapsulating module via the universal interface;
- wherein the embedded device is not configured with any physical network interface for transmitting/receiving IP packets, the embedded device is only configured with the virtual network interface to the universal interface, which is Universal Asynchronous Receiver/Transmitter (UART), Inter Integrated Circuit (I2C) or Serial Peripheral Interface (SPI).

5. The embedded device according to claim 4, wherein:
- the sending/receiving module is further preset with a receiving callback function, the receiving callback function is configured to receive an IP packet by using the universal interface.

\* \* \* \* \*